(12) United States Patent
Mizumoto

(10) Patent No.: US 11,600,834 B2
(45) Date of Patent: Mar. 7, 2023

(54) FUEL GAS INJECTION APPARATUS

(71) Applicant: HONDA MOTOR CO., LTD., Tokyo (JP)

(72) Inventor: Kazuya Mizumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/583,248

(22) Filed: Jan. 25, 2022

(65) Prior Publication Data

US 2022/0246957 A1 Aug. 4, 2022

(30) Foreign Application Priority Data

Feb. 1, 2021 (JP) .............................. JP2021-014224

(51) Int. Cl.
| | |
|---|---|
| *H01M 8/04082* | (2016.01) |
| *H01M 8/0438* | (2016.01) |
| *H01M 8/04014* | (2016.01) |
| *H01M 8/04089* | (2016.01) |

(52) U.S. Cl.
CPC ... *H01M 8/04201* (2013.01); *H01M 8/04014* (2013.01); *H01M 8/04089* (2013.01); *H01M 8/04425* (2013.01)

(58) Field of Classification Search
None
See application file for complete search history.

(56) References Cited

U.S. PATENT DOCUMENTS

2001/0014301 A1 * 8/2001 Nakamura ............ F28D 7/0066
422/198

FOREIGN PATENT DOCUMENTS

| JP | 2008-130492 | 6/2008 |
|---|---|---|
| JP | 2009-070641 | 4/2009 |
| JP | 2012-156033 | 8/2012 |
| JP | 2015-209043 | 11/2015 |
| JP | 2016-184490 | 10/2016 |
| JP | 2017-025727 | 2/2017 |
| JP | 2018-128109 | 8/2018 |
| JP | 2019-029100 | 2/2019 |
| JP | 2020-136197 | 8/2020 |

OTHER PUBLICATIONS

Japanese Office Action for Japanese Patent Application No. 2021-014224 dated Nov. 1, 2022.

* cited by examiner

*Primary Examiner* — Haroon S. Sheikh
(74) *Attorney, Agent, or Firm* — Amin, Turocy & Watson, LLP

(57) ABSTRACT

A fuel gas injection apparatus includes a chamber, a heat exchanger, a supply manifold, injectors, and a mount body. The chamber is in communication with a fuel gas tank, and the heat exchanger is in communication with the chamber. The supply manifold is in communication with the heat exchanger and has a plurality of branched flow channels for flowing a fuel gas. The plurality of injectors detachably communicate with the branched flow channels of the supply manifold. The mount body is in communication with the plurality of injectors and guides the fuel gas injected from plurality of injectors to a fuel cell stack. The chamber and the heat exchanger are attached to the mount body.

3 Claims, 3 Drawing Sheets

FUEL GAS INJECTION APPARATUS

CROSS-REFERENCE TO RELATED APPLICATION

Priority is claimed on Japanese Patent Application No. 2021-014224, filed Feb. 1, 2021, the content of which is incorporated herein by reference.

BACKGROUND OF THE INVENTION

Field of the Invention

The present invention relates to a fuel gas injection apparatus.

Description of Related Art

As a fuel gas injection apparatus of a fuel cell system, for example, a configuration in which introduction ports of a plurality of injectors are in communication with a supply manifold and discharge ports of the plurality of injectors are in communication with a mount body of a fuel cell is known (for example, see Japanese Unexamined Patent Application, First Publication No. 2012-156033). In the fuel gas injection apparatus, for example, a fuel gas tank is in communication with the supply manifold via a heat exchanger, a chamber, a fuel gas supply route, and the like.

A fuel gas stored in the fuel gas tank is supplied to the injector via the fuel gas supply route, a chamber, a heat exchanger, and the like. The fuel gas supplied to the injector is injected from the injector and guided to the mount body. The fuel gas guided to the mount body is guided to the ejector, and for example, is mixed with a fuel off-gas in the ejector.

That is, the fuel off-gas is guided to the ejector from the fuel gas outlet of the fuel cell, and suctioned by a negative pressure in the ejector to be mixed with a fuel gas. The mixed gas of the fuel gas and the fuel off-gas is supplied to the fuel cell (the fuel cell stack) from the ejector.

SUMMARY OF THE INVENTION

Here, in the fuel gas injection apparatus in the related art, for example, the plurality of injectors are interposed between the supply manifold and the mount body, and the heat exchanger or the chamber is provided in the supply manifold. In addition, for example, the mount body is attached to the end plate of the fuel cell stack connected to the ejector.

For this reason, for example, upon maintenance (repair, inspection) of the injector, there is a need to remove the plurality of (many) parts such as the supply manifold, the heat exchanger, the chamber, and the like from the fuel gas injection apparatus. In this way, it takes much time and effort to repair and inspect the injector, and there is room for improvement in view of this.

An aspect of the present invention is directed to providing a fuel gas injection apparatus capable of satisfactorily improving repair and inspection properties of an injector.

(1) A fuel gas injection apparatus according to an aspect of the present invention includes a chamber in communication with a fuel gas tank in which a fuel gas is stored; a heat exchanger that is in communication with the chamber and that is configured to exchange heat with the fuel gas; a supply manifold that is in communication with the heat exchanger and that has a plurality of branched flow channels for flowing the fuel gas; an injector that detachably communicates with the branched flow channels of the supply manifold; and a mount body that is in communication with the injector and that is configured to guide the fuel gas injected from the injector to a fuel cell, and the chamber and the heat exchanger are attached to the mount body.

According to the configuration of the aspect of the above-mentioned (1), the chamber and the heat exchanger are attached to the mount body. Accordingly, only the supply manifold is attached to the injector from which a fuel gas is supplied. Accordingly, for example, when the injectors are repaired and inspected (i.e., maintenance), by removing only the supply manifold from the fuel gas injection apparatus, the injectors can be easily removed from the mount body. As a result, repair and inspection properties of the injectors can be improved appropriately.

(2) In the aspect of the above-mentioned (1), the fuel gas injection apparatus may further include an intermediate joint that is provided between the heat exchanger and the supply manifold and that is configured to bring the heat exchanger and the supply manifold in communication with each other.

According to the configuration of the aspect of the above-mentioned (2), the heat exchanger and the supply manifold are in communication with each other at the intermediate joint. Accordingly, for example, the heat exchanger can be separated from the supply manifold and attached to the mount body.

Here, for example, when the heat exchanger is attached to the supply manifold, in order to secure sealability with respect to the supply manifold, there is a need to accurately form the heat exchanger matching with a shape of the supply manifold. However, the heat exchanger is generally formed of a sheet metal through pressing. For this reason, it is difficult to accurately form the heat exchanger matching with a shape of the supply manifold.

Here, the heat exchanger is attached to the mount body and the heat exchanger is in communication with the supply manifold via the intermediate joint. For this reason, it is possible to absorb the tolerance due to the pressing of the heat exchanger at the intermediate joint. Accordingly, facilitation of manufacture and reduction in cost of the heat exchanger can be achieved without increasing molding accuracy of the heat exchanger more than necessary.

(3) In the aspect of the above-mentioned (2), the fuel gas injection apparatus may further include a pressure sensor that is provided at a position close and along the intermediate joint and that is configured to detect a pressure of the fuel gas flowing through the intermediate joint.

According to the configuration of the aspect of the above-mentioned (3), the pressure sensor is provided at a position close and along the intermediate joint (i.e., a position in the middle of the intermediate joint in the longitudinal direction). In this way, by providing the pressure sensor at the intermediate joint, a pressure of the fuel gas flowing through the intermediate joint can be detected by the pressure sensor. Accordingly, a pressure of the fuel gas guided to the supply manifold from the intermediate joint can be detected. An operation time of the injectors according to a power generation state of the fuel cell stack is determined on the basis of the detected pressure. For this reason, for example, there is no need to provide the pressure sensor in the supply manifold.

Accordingly, for example, when the injectors are repaired and inspected, by removing only the supply manifold from the fuel gas injection apparatus, the injectors can be easily removed from the mount body.

According to the aspect of the present invention, the chamber and the heat exchanger are attached to the mount body. Accordingly, it is possible to satisfactorily improve repair and inspection properties of the injector.

DETAILED DESCRIPTION OF THE INVENTION

Hereinafter, a fuel gas injection apparatus in which an embodiment of the present invention is provided in a fuel cell system based on the drawings will be described.

<Fuel Cell System>

Figure 1:
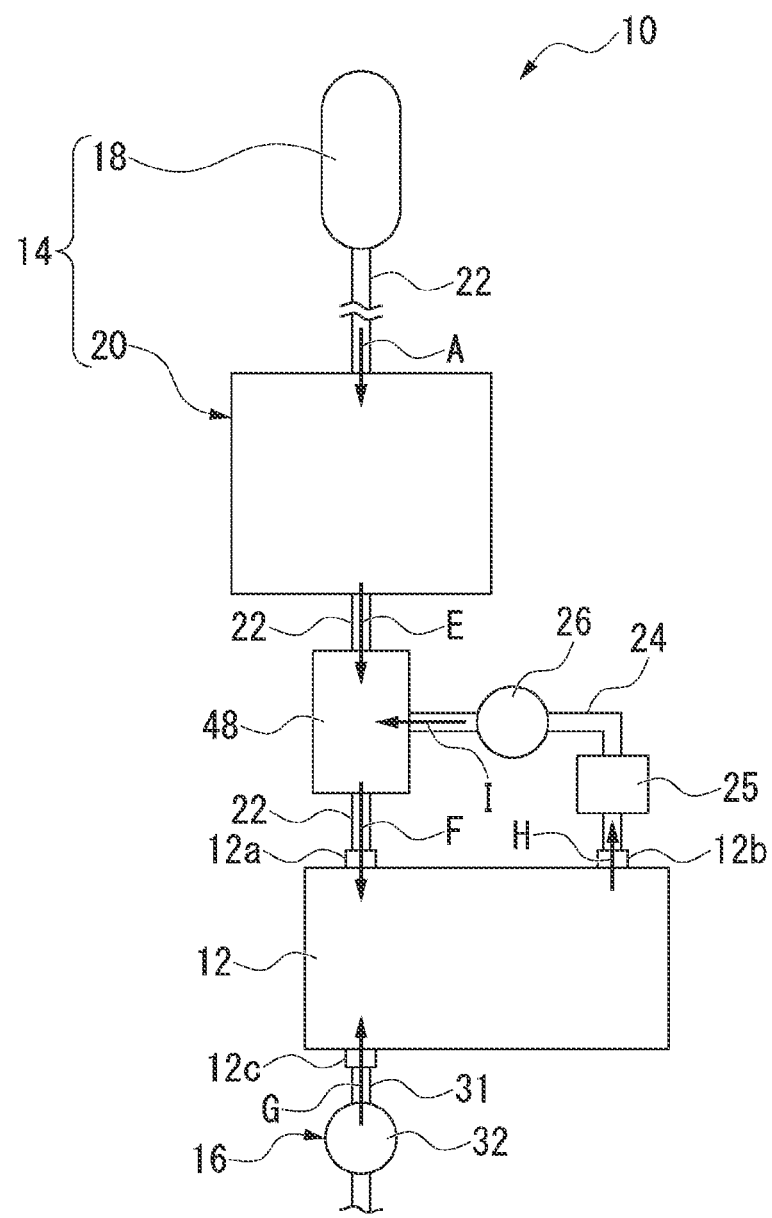
FIG. 1 is a conceptual view of a fuel cell system including a fuel gas injection apparatus according to an embodiment of the present invention.

FIG. 1 is a conceptual view of a fuel cell system 10.

As shown in FIG. 1, the fuel cell system 10 is mounted on a fuel cell vehicle (not shown) such as a fuel cell electric vehicle or the like.

The fuel cell system 10 includes a fuel cell stack (a fuel cell) 12, a fuel gas supply apparatus 14, and an oxidant gas supply apparatus 16.

In the fuel cell stack 12, a plurality of generation cells are stacked in a horizontal direction or a vertical direction. The generation cells are configured by sandwiching an electrolyte membrane/electrode structure between a first separator and a second separator. The first separator and the second separator are constituted by a metal separator or a carbon separator.

The fuel gas supply apparatus 14 includes a fuel gas tank 18 and a fuel gas injection apparatus 20. A high pressure fuel gas (for example, high pressure hydrogen) is stored in the fuel gas tank 18. A fuel gas in the fuel gas tank 18 is supplied from a fuel gas inlet 12a of the fuel cell stack 12 to an anode electrode via a fuel gas supply route 22 and the fuel gas injection apparatus 20. The fuel gas injection apparatus 20 will be described in detail with reference to the following FIG. 2 and FIG. 3.

A circulation flow channel 24 is in communication with a fuel off-gas outlet 12b of the fuel cell stack 12. The fuel gas, (at least) some of which is used on the anode electrode of the fuel cell stack 12, (hereinafter, also referred to as a fuel off-gas) is introduced into the circulation flow channel 24 from the fuel cell stack 12. A gas-liquid separator 25 and a circulation pump 26 are provided in the circulation flow channel 24. In particular, when starting the fuel cell stack 12, the circulation pump 26 circulates the fuel off-gas introduced into the circulation flow channel 24 from the anode electrode of the fuel cell stack 12 to an ejector 48 (to be described below) of the fuel gas injection apparatus 20 via the circulation flow channel 24.

The oxidant gas supply apparatus 16 includes an oxidant gas pump 32 provided in an oxidant gas supply route 31. The oxidant gas supply route 31 is in communication with an oxidant gas inlet 12c of the fuel cell stack 12. The oxidant gas pump 32 compresses an oxidant gas (for example, air from the atmosphere) and supplies the oxidant gas to a cathode electrode of the fuel cell stack 12.

<Fuel Gas Injection Apparatus>

Figure 2:
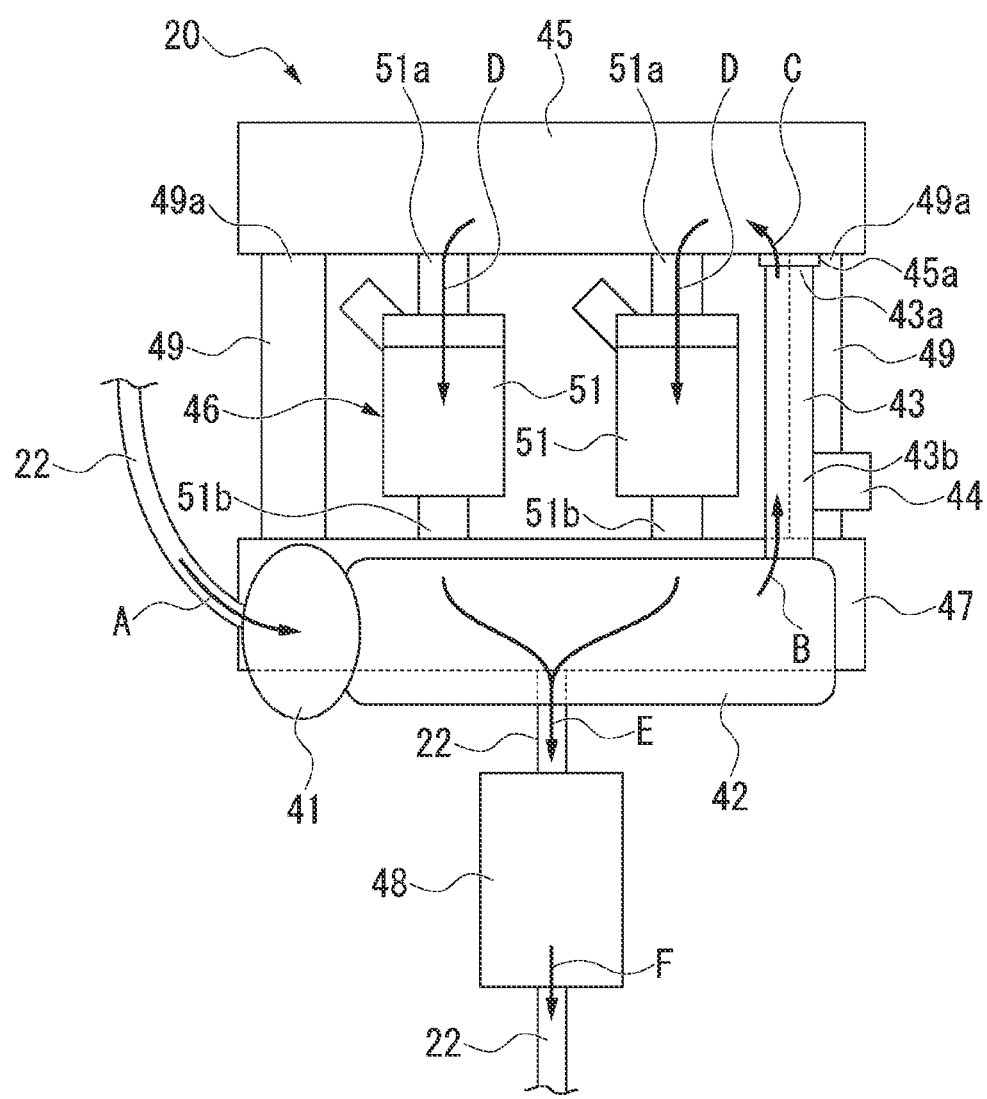
FIG. 2 is a conceptual view of the fuel gas injection apparatus according to the embodiment of the present invention.

FIG. 2 is a conceptual view of the fuel gas injection apparatus 20.

As shown in FIG. 1 and FIG. 2, the fuel gas injection apparatus 20 is provided in the fuel gas supply route 22. The fuel gas injection apparatus 20 includes a chamber 41, a heat exchanger 42, an intermediate joint 43, a pressure sensor 44, a supply manifold 45, an injector apparatus 46, a mount body 47, and the ejector 48.

The mount body 47 includes, for example, a pair of body leg portions (not shown) raised from both end portions thereof. A supply manifold 45 is detachably attached to tip portions 49a of a pair of body leg portions 49. The chamber 41 and the heat exchanger 42 are provided on the mount body 47. For example, the injector apparatus 46 is detachably interposed between the mount body 47 and the supply manifold 45. In addition, for example, the mount body 47 is connected to the ejector 48 and is attached to an end plate (not shown) of the fuel cell stack 12.

In the chamber 41, for example, the introduction port is in communication with the fuel gas tank 18 via the fuel gas supply route 22. The chamber 41 is, for example, an expansion chamber configured to adjust a high pressure fuel gas guided from the fuel gas tank 18 to an appropriate gas pressure. The heat exchanger 42 is in communication with the discharge port of the chamber 41, and preheats the fuel gas introduced from the chamber 41 to, for example, an appropriate gas temperature (heat exchange).

The intermediate joint 43 is interposed between the heat exchanger 42 and the supply manifold 45, and is in communication with the discharge port of the heat exchanger 42 and the introduction port of the supply manifold 45. That is, the intermediate joint 43 is a flow channel configured to guide the fuel gas of the heat exchanger 42 from the discharge port of the heat exchanger 42 to the introduction port of the supply manifold 45 by bringing the heat exchanger 42 and the supply manifold 45 in communication with each other.

The intermediate joint 43 has a joint discharge port 43a that detachably communicates with an introduction port 45a of the supply manifold 45. The joint discharge port 43a and the introduction port 45a of the supply manifold 45 are sealed with a seal member such as an O-ring or the like.

The pressure sensor 44 is provided at a position 43b close and along the intermediate joint 43 (i.e., a position in the middle of the intermediate joint 43 in the longitudinal direction). The pressure sensor 44 detects a pressure of a fuel gas flowing through the intermediate joint 43.

The supply manifold 45 is in communication with the heat exchanger 42 via the intermediate joint 43. In addition, the supply manifold 45 has a plurality of branched flow channels corresponding to a plurality of injectors 51 (to be described below) that constitute the injector apparatus 46. The plurality of branched flow channels are in communication with the plurality of injectors 51.

The supply manifold 45 guides the fuel gas introduced from the intermediate joint 43 to the injector apparatus 46 (i.e., the plurality of injectors 51) via the plurality of branched flow channels.

The injector apparatus 46 includes the plurality of (in the embodiment, two) injectors 51. While two injectors are exemplified as the plurality of injectors 51 in the embodiment, the number of the injectors 51 can be selected arbitrarily. The plurality of injectors 51 are provided in parallel with each other, and introduction ports 51a thereof detachably communicate with the discharge ports of the branched flow channels of the supply manifold 45. The introduction ports 51a of the plurality of injectors 51 and the branched flow channels of the supply manifold 45 are sealed with a seal member such as an O-ring or the like.

The supply manifold 45 is detachably attached to the injector apparatus 46 (i.e., the plurality of injectors 51) and the intermediate joint 43.

For example, the plurality of injectors 51 open the valves to open the flow channels by applying power to a coil (solenoid), and close the valves to close the flow channels by blocking power application to the coil. A fuel gas is introduced into the plurality of injectors 51 via the branched flow channels of the supply manifold 45, the introduction ports 51a, and the like. In this state, for example, the flow channels of the plurality of injectors 51 are open. Accordingly, the fuel gas introduced into the introduction ports 51a of the plurality of injectors 51 is injected to discharge ports 51b of the injectors 51 via the flow channels that are open.

The plurality of injectors 51 have the discharge ports 51b that are each in communication with the introduction ports of the mount body 47. The mount body 47 has a plurality of merging flow channels in communication with the discharge ports 51b of the plurality of injectors 51. The plurality of merging flow channels have a plurality of introduction ports, and the discharge ports are integrated into one.

The discharge ports 51b of the plurality of injectors 51 detachably communicate with the plurality of introduction ports (not shown) of the merging flow channels of the mount body 47. The discharge ports 51b of the plurality of injectors 51 and the plurality of introduction ports of the merging flow channels of the mount body 47 are sealed with a seal member such as an O-ring or the like.

Accordingly, the plurality of injectors 51 are disposed between the supply manifold 45 and the mount body 47, and detachably held while being sandwiched between the supply manifold 45 and the mount body 47.

In the mount body 47, one discharge port of the plurality of merging flow channels is in communication with the introduction port of the ejector 48 via the fuel gas supply route 22.

For example, the ejector 48 mixes the fuel gas introduced from the fuel gas supply route 22 with the fuel off-gas introduced from the circulation flow channel 24 by suctioning the fuel off-gas. The mixed gas in which the fuel off-gas is mixed with the fuel gas by the ejector 48 is supplied to the fuel cell stack 12 from the discharge ports 51b of the ejector 48. That is, the mount body 47 guides the fuel gas (specifically, the mixed gas) injected (discharged) from the plurality of injectors 51 to the fuel cell stack 12 via the ejector 48.

In this way, in the fuel gas injection apparatus 20, the mount body 47 is in communication with the discharge ports 51b of the plurality of injectors 51, and the supply manifold 45 is in communication with the introduction ports 51a of the plurality of injectors 51. For this reason, the mount body 47 is provided at a position separated from the supply manifold 45. In addition, the fuel gas injection apparatus 20 includes the intermediate joint 43, and is configured to bring the heat exchanger 42 in communication with the supply manifold 45 via the intermediate joint 43. Accordingly, the chamber 41 and the heat exchanger 42 can be separated from the supply manifold 45 and attached to the mount body 47.

Incidentally, for example, it is also possible to attach the heat exchanger 42 to the supply manifold 45. In this case, in order to secure sealability with respect to the supply manifold 45, it is necessary to accurately form the heat exchanger 42 matching with the shape of the supply manifold 45.

However, the heat exchanger 42 is generally formed from sheet metal through pressing. For this reason, it is difficult to accurately form the heat exchanger 42 through pressing matching with the shape of the supply manifold 45.

Therefore, in the fuel gas injection apparatus 20, the heat exchanger 42 is attached to the mount body 47, and the heat exchanger 42 is in communication with the supply manifold 45 via the intermediate joint 43. For this reason, a molding tolerance when the heat exchanger 42 is formed through pressing can be absorbed by the intermediate joint 43. Accordingly, facilitation of manufacture and reduction in cost of the heat exchanger 42 can be achieved without increasing molding accuracy of the heat exchanger 42 more than necessary.

In addition, when the intermediate joint 43 is provided in the fuel gas injection apparatus 20, the pressure sensor 44 can be separated from the supply manifold 45 and provided at the position 43b close and along the intermediate joint 43. A pressure of the fuel gas guided from the intermediate joint 43 to the supply manifold 45 can be detected by detecting the pressure of the fuel gas that flows through the intermediate joint 43 using the pressure sensor 44. An operation time of the injectors 51 is determined according to a power generation state of the fuel cell stack 12 on the basis of the detected pressure.

<Operation of Fuel Cell System>

Next, an operation of the fuel cell system 10 will be described.

The fuel gas is supplied from the fuel gas tank 18 to the chamber 41 of the fuel gas injection apparatus 20 as shown by an arrow A. The fuel gas supplied to the chamber 41 is guided to the intermediate joint 43 via the heat exchanger 42 as shown by an arrow B. A pressure of the fuel gas guided to the intermediate joint 43 is detected by the pressure sensor 44. The fuel gas guided to the intermediate joint 43 is guided to the supply manifold 45 via the intermediate joint 43 as shown by an arrow C.

The fuel gas guided to the supply manifold 45 is guided to the plurality of injectors 51 via the branched flow channels of the supply manifold 45 as shown by an arrow D. In this state, the valves provided in the plurality of injectors 51 are opened, and the fuel gas is injected from the discharge paths of the plurality of injectors 51. The injected fuel gas is discharged to the ejector 48 via the merging flow channel of the mount body 47 as shown by an arrow E. The fuel gas discharged to the ejector 48 is supplied to the anode electrode of the fuel cell stack 12 via the ejector 48 as shown by an arrow F.

Meanwhile, the oxidant gas is sent to the oxidant gas pump 32 of the oxidant gas supply apparatus 16. The oxidant gas is compressed by the oxidant gas pump 32 and supplied to the cathode electrode of the fuel cell stack 12 as shown by an arrow G.

For this reason, the fuel gas supplied to the anode electrode of the fuel cell stack 12 and the oxygen in the oxidant gas supplied to the cathode electrode of the fuel cell stack 12 are consumed in the electrode catalyst layer by an electrochemical reaction to perform power generation.

Here, for example, some of the fuel gas is consumed upon the electrochemical reaction of the fuel gas and the oxygen. The fuel gas, some of which has been consumed, is guided to the circulation flow channel 24 from the fuel off-gas outlet 12b as the fuel off-gas as shown by an arrow H. The fuel off-gas is guided to the ejector 48 via the circulation flow channel 24 as shown by an arrow I.

The fuel off-gas introduced into the ejector 48 is suctioned by an action of a negative pressure generated by discharge of the fuel gas, and mixed with the fuel gas in the ejector 48. The mixed gas of the fuel gas and the fuel off-gas is supplied to the anode electrode of the fuel cell stack 12 from the ejector 48 as shown by the arrow F.

<Repair and Inspection of Fuel Gas Injection Apparatus>

Figure 3:
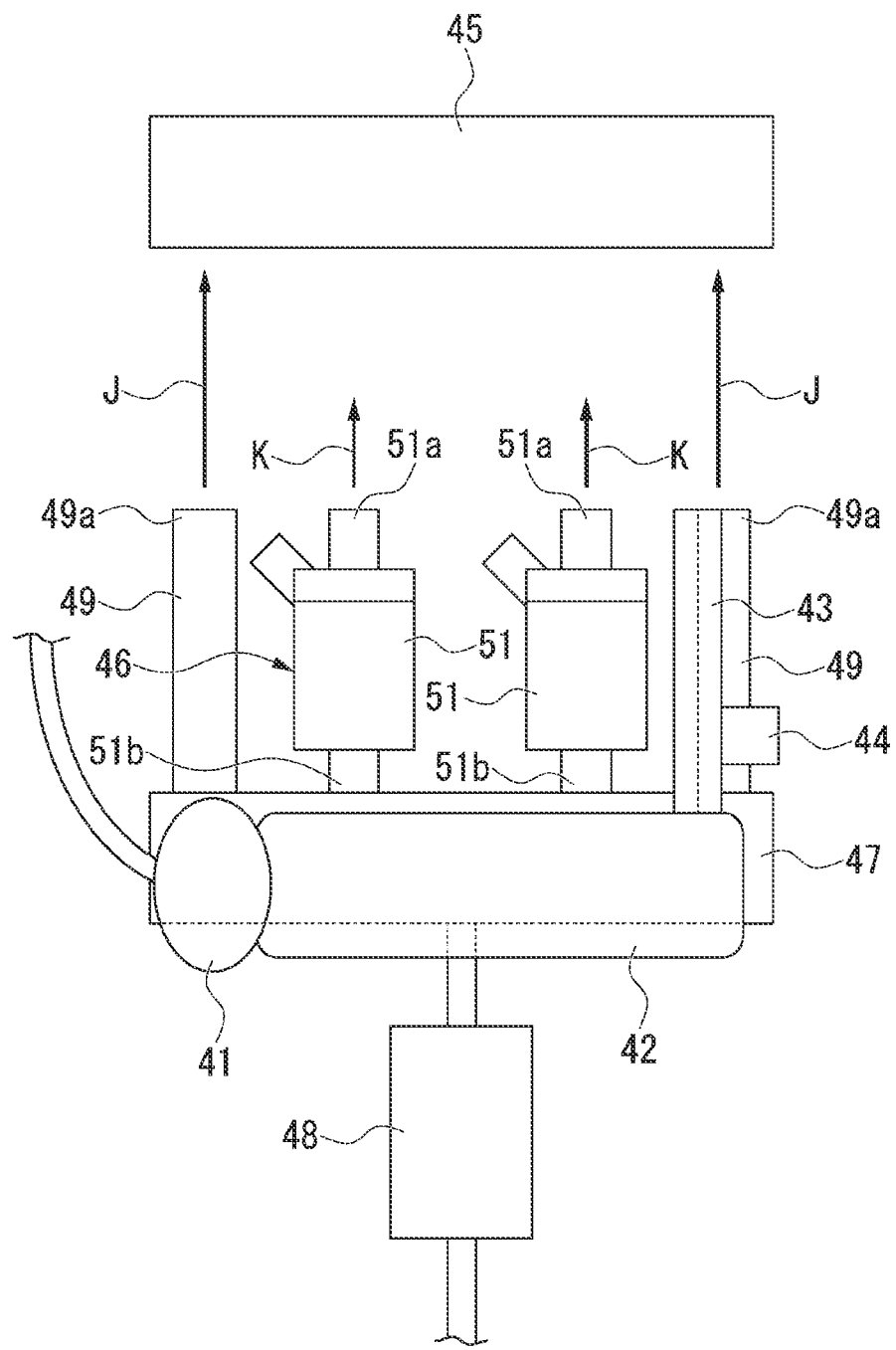
FIG. 3 is a conceptual view for describing a sequence when the fuel gas injection apparatus according to the embodiment of the present invention is repaired and inspected.

FIG. 3 is a conceptual view for describing a sequence when the fuel gas injection apparatus 20 is repaired and inspected.

As shown in FIG. 2 and FIG. 3, the chamber 41 and the heat exchanger 42 are separated from the supply manifold 45 and attached to the mount body 47. For this reason, only the supply manifold 45 is attached to the introduction ports 51a of the plurality of injectors 51 (i.e., the tip portions 49a of the pair of body leg portions 49).

In addition, for example, the injector apparatus 46 (i.e., the plurality of injectors 51) is detachably held with respect to two members of the supply manifold 45 and the mount body 47 while being sandwiched between the supply manifold 45 and the mount body 47. Further, for example, the supply manifold 45 is detachably attached to the intermediate joint 43.

For this reason, for example, when the plurality of injectors 51 are repaired and inspected (i.e., maintenance), only the supply manifold 45 is removed from the tip portions 49a of the pair of body leg portions 49 as shown by an arrow J. Accordingly, the plurality of injectors 51 can be exposed between the tip portions 49a of the pair of body leg portions 49.

As a result, the plurality of injectors 51 exposed between the tip portions 49a of the pair of body leg portions 49 can be easily removed from the mount body 47 as shown by an arrow K. Accordingly, repair and inspection properties of the plurality of injectors 51 can be improved.

In addition, the pressure sensor 44 is separated from the supply manifold 45 and provided at the position 43b close and along the intermediate joint 43. By providing the pressure sensor 44 on the intermediate joint 43, a pressure of the fuel gas flowing through the intermediate joint 43 can be detected by the pressure sensor 44. That is, a pressure of the fuel gas guided to the supply manifold 45 from the intermediate joint 43 can be detected by the pressure sensor 44.

For this reason, there is no need to provide the pressure sensor 44 in the supply manifold 45. Accordingly, for example, when the plurality of injectors 51 are repaired and inspected, only the supply manifold 45 can be removed from the tip portions 49a of the pair of body leg portions 49 as shown by the arrow J. Accordingly, the plurality of injectors 51 can be easily removed from the mount body 47 as shown by the arrow K, and repair and inspection properties of the plurality of injectors 51 can be improved appropriately.

Further, the technical scope of the present invention is not limited to the embodiment, and various modifications may be made without departing from the scope of the present invention.

For example, although the example in which the pressure sensor 44 is provided on the intermediate joint 43 has been exemplarily described in the embodiment, there is no limitation thereto. As another example, for example, the pressure sensor may be provided at another place such as the chamber 41 or the like upstream from the supply manifold 45.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A fuel gas injection apparatus comprising:
a chamber in communication with a fuel gas tank in which a fuel gas is stored;
a heat exchanger that is in communication with the chamber and that is configured to exchange heat with the fuel gas;
a supply manifold that is in communication with the heat exchanger and that has a plurality of branched flow channels for flowing the fuel gas;
an injector that detachably communicates with the branched flow channels of the supply manifold; and
a mount body that is in communication with the injector and that is configured to guide the fuel gas injected from the injector to a fuel cell,
wherein the chamber and the heat exchanger are attached to the mount body.

2. The fuel gas injection apparatus according to claim 1, comprising an intermediate joint that is provided between the heat exchanger and the supply manifold and that is configured to bring the heat exchanger and the supply manifold in communication with each other.

3. The fuel gas injection apparatus according to claim 2, comprising a pressure sensor that is provided at a position close and along the intermediate joint and that is configured to detect a pressure of the fuel gas flowing through the intermediate joint.

* * * * *